July 6, 1965   F. KLEINSTÜCK   3,192,830
MACHINE FOR THE MANUFACTURE OF GEARS
Filed Feb. 23, 1962   9 Sheets-Sheet 1

Inventor:
Fritz Kleinstück
By Bailey, Stephens & Huettig
ATTORNEYS

July 6, 1965  F. KLEINSTÜCK  3,192,830
MACHINE FOR THE MANUFACTURE OF GEARS
Filed Feb. 23, 1962  9 Sheets-Sheet 9

INVENTOR
FRITZ KLEINSTÜCK
BY Bailey, Stephens &
Huettig
ATTORNEYS

United States Patent Office 3,192,830
Patented July 6, 1965

3,192,830
MACHINE FOR THE MANUFACTURE OF GEARS
Fritz Kleinstück, Jahnstrasse 51, Gaggenau,
Murgtal, Germany
Filed Feb. 23, 1962, Ser. No. 175,371
17 Claims. (Cl. 90—3)

The invention relates to a machine for the manufacture of externally toothed pinions or herring-bone gears, by cutting or grinding, in which a master gear and the gear blank to be shaped are mounted on the same shaft. Such machines work step-by-step with profilers or in a generating process with hobs, rack-shaped cutters or pinion-type cutters.

The tools required are in most cases complicated and quite expensive shaping tools and because of this cannot usually be made of hard metals, so that only low cutting speeds are possible. As a result, these tools either cannot cut simultaneously over the whole area or cannot work over the whole breadth of the tooth, which results in slowness in operating on the gear blank and makes the procedure quite expensive.

The object of the present invention is to provide a machine which overcomes the disadvantages discussed above and makes possible a more rapid and effective manufacture of gears.

This is accomplished according to the invention by using two large, but simple, planing tools with parallel facing surfaces, each operating simultaneously on two tooth flanks of the blank across the width of the blank. The axes of rotation of the tools are stationary during working, and the shaft which carries the master gear and the gear blank is mounted for movement in a curved, closed path in each complete cycle of rotation of the master gear. The master gear and the gear blank when not engaged with the planing tools are uniformly moved by engagement with a first counter gear whereas during engagement of the gear blank with the planing tools through engagement with a second counter gear, a turning movement is imparted which differs from the uniform turning movement during non-engagement.

Further objects and advantages of the invention will appear more fully in the following description especially in conjunction with the accompanying drawings.

FIG. 15 shows a cutting member mounted on a shaft, while FIG. 16 shows the same member off the shaft;

Figure 1:
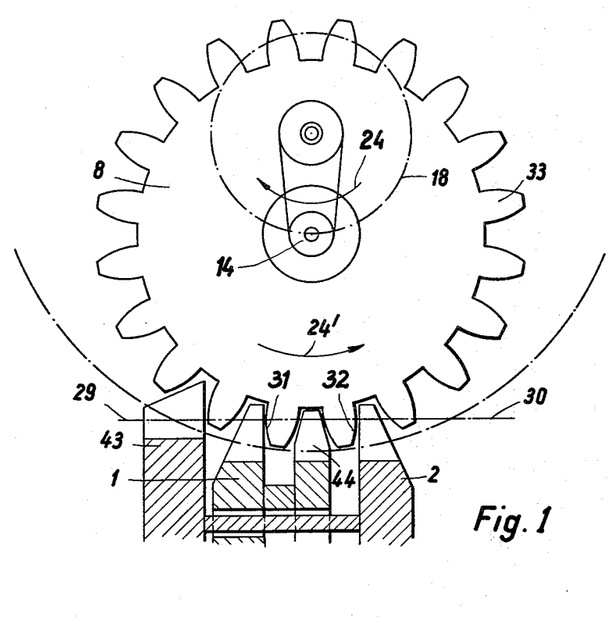
FIG. 1 shows the gear blank in side elevation with the planing members in section.
Figure 4:
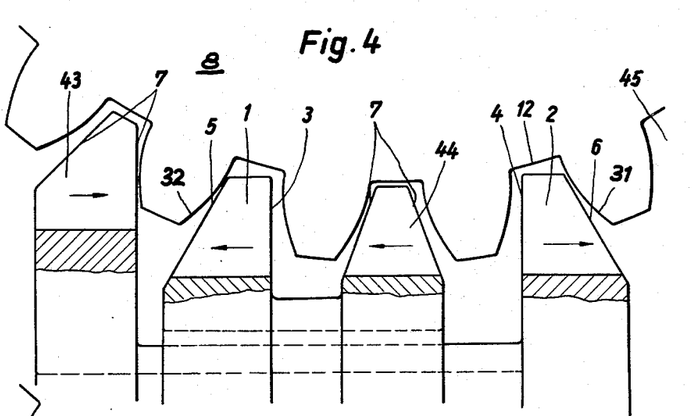
FIGS. 4 and 5 show the axially adjustable cutting members in two different positions.
Figure 5:
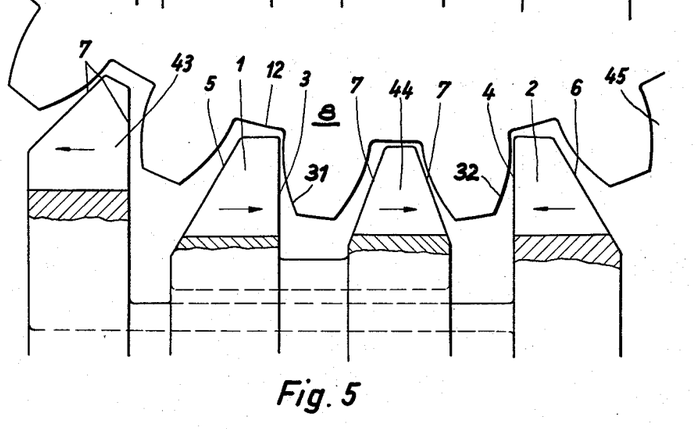
Figure 6:
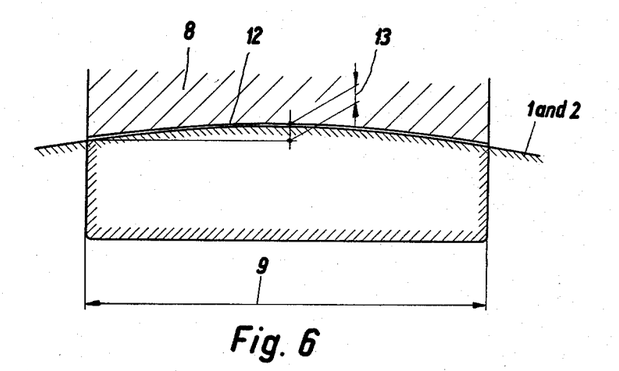
FIGS. 6 and 7 are explanatory diagrams.

With reference to FIGS. 1, 4, and 5, the two quite large, but simple planing tools 1 and 2 with their cutting surfaces 3 to 6, operate on the tooth flanks 31 and 32 of the gear blank 8. The cutting surfaces 3 and 4 serve, as is explained below, as the main cutting surfaces for finishing the gear while cutting surfaces 5 and 6 act as rough cutting surfaces for pre-cutting. If the gear blank to be worked on has a small width, the operation can cover the whole width of the blank. However, if the blank is wider, as is shown at 9 in FIG. 6, an undesirable arching 13 of the tooth gap base 12 results. It is advantageous to carry out the operation in several sections 11, so that only small archings 13' result. The arrangement for this is described hereinafter.

Figure 3:
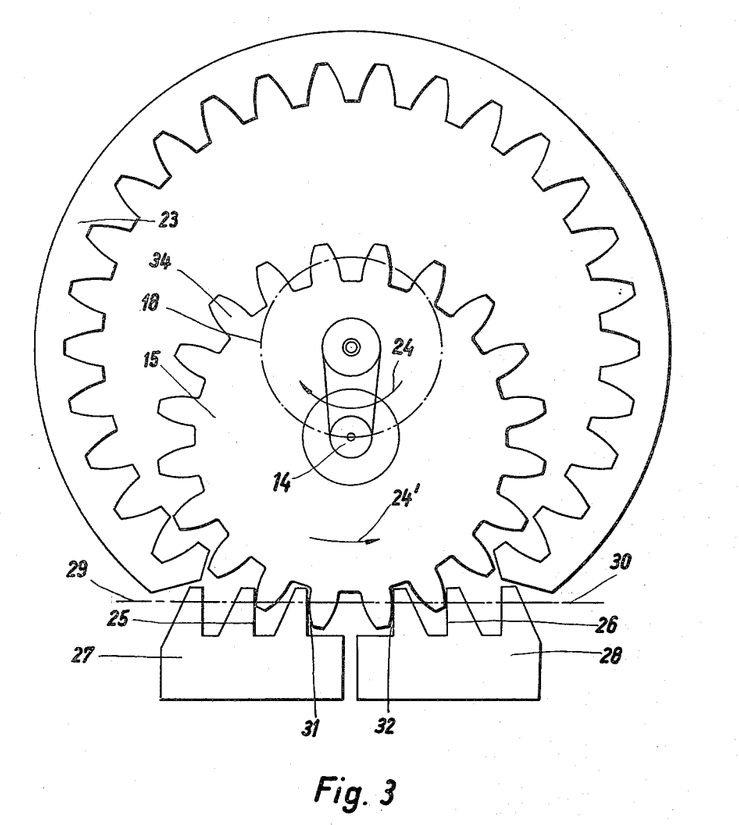
FIG. 3 shows in side elevation the master gear and the co-operating racks.
Figures 9, 11, 12:
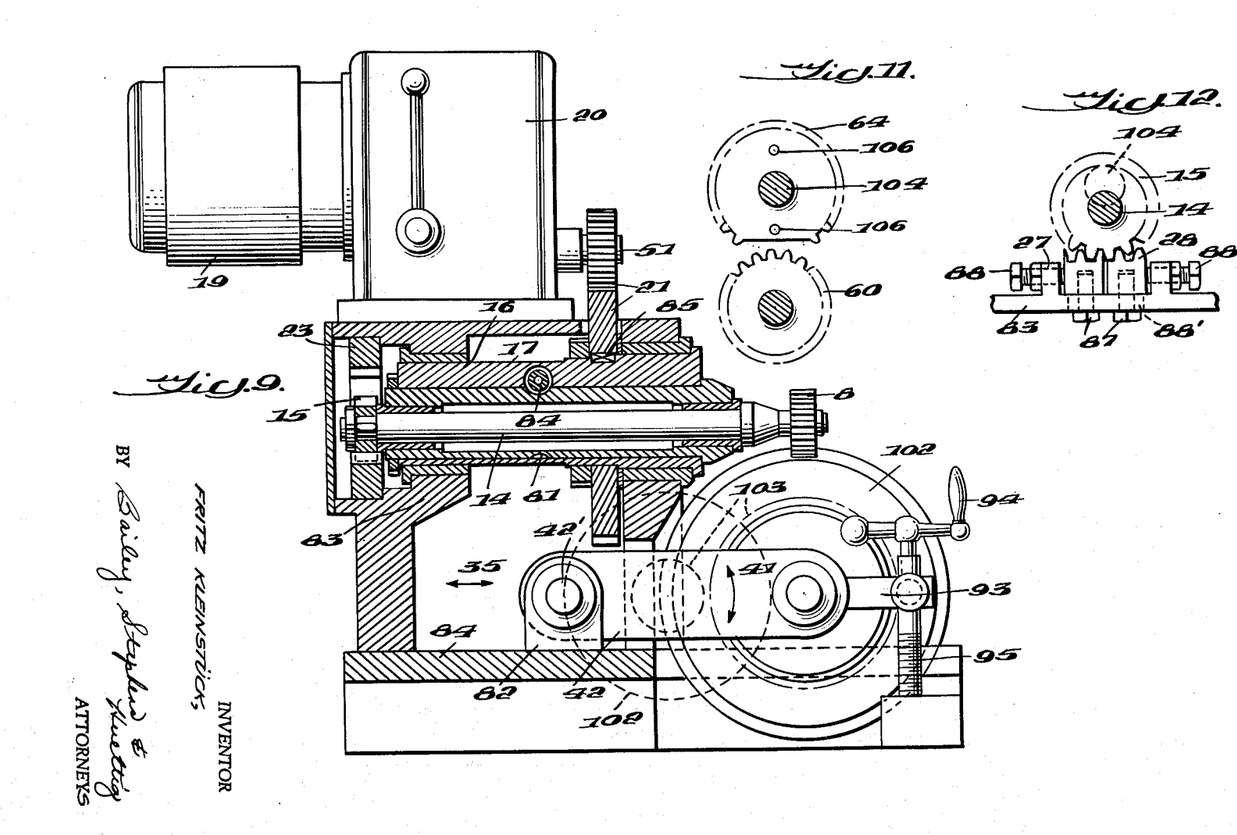
FIG. 9 shows, with parts in section, at right angles to FIG. 8, the mounting of the master gear and the gear blank to be cut as well as the mounting of the work piece.
FIGS. 11 and 12 are cross-sections on the lines 11—11 and 12—12 of FIG. 10.

The gear blank to be worked is mounted, in the form shown in FIG. 9, with a master gear 15 on a shaft 14, which is turnable within one of two hollow spindles 16 and 17 arranged one within the other forming a double spindle. For example, a threaded member 80 turnably mounted in member 16 may engage a worm-like track 81 in the periphery of spindle 17, so that the relative angular portions of the two spindles can be adjusted. These hollow spindles 16 and 17 are each provided with an eccentric axial bore, the hollow spindle 17 being turnable in the axial bore of spindle 16, but fixable therein and the shaft 14 being turnable in the axial bore of the spindle 17. The double spindle formed of these two hollow spindles is turnably mounted in a pedestal on the machine frame. The double spindle 16 and 17 is driven from a motor 19 by a transmission 20 and a gear drive 21, the final gear of which is fastened on hollow spindle 16 by the key 85 so that the shaft 14 follows an eccentric circle 18 (FIG. 3). Through relative turning and tightening of the two hollow spindles the diameter of the eccentric circle 18 and the degree of eccentricity can be adjusted.

The master gear 15 co-operates with a first counter gear which in the modification shown in FIG. 9 consists of a stationary internally toothed segment 23 mounted in bearing block 83. When the shaft 14 turns in the eccentric circle 18 in the direction of arrow 24 (FIG. 3), the master gear travels uniformly with it in the segment 23 in the direction of the arrow 24'; that is, it runs inside the toothed segment like a planet gear. Such a cycle of movement in the direction of arrow 24' imparts movement to the gear blank 8 which is rigidly connected through shaft 14 with the master gear. This eccentric uniform cycle of movement brings the gear blank 8 sidewise into the range of the planing tools 1 and 2, so that it is operated on by engagement with these tools. During this work interval it is important for a further reason, to be described below, that the gear blank 8 undergo a cycle of movement different from the uniform movement. This is accomplished by engaging the master gear 15 during the operating period with a second counter gearing. For this purpose, according to FIGS. 3, 9 and 12, the toothed segments 23 in that area corresponding to the position in which the gear blank is in engagement with the planing tools is cut away, and this gap is bridged by a rack 27, 28, so that the master gear 15, during a part of its eccentric cycle, rolls on the internally toothed segment and, during another part, on the rack. As is shown in FIGS. 3 and 12, the rack consists of two groups of teeth spaced apart in the longitudinal direction which are provided with parallely facing tooth faces 25, 26, so that the master gear may run without the play in the group of teeth of the rack. The rack is divided into two halves 27, 28, each of which carries a group of teeth. The two halves of the rack are mounted so as to be adjustable towards or away from one by means of bolts 87 threaded in the rack parts and adjustable in a slot 88' in bearing block 83.

The movement of the gear blank 8 inside the planing tools 1 and 2 should be different from the normal uniform movement of the master gear 15 inside the internal gear segment 23 so that the two lines of engagement 29 and 30 of the two involute toothed flanks 31 and 32, with the teeth 34 of the master gear and the teeth 33 of the gear blank will fall in a common straight line.

During each eccentric cycle of the master gear and the gear blank around the eccentric circle 18 in the direction of arrows 24, 24', the gear blank 8 and the master gear 15 turn through one or several tooth divisions, so that eventually all of the teeth 33 of the gear blank 8 come into range of operation of planing tools 1 and 2 and are worked by them. The numbers of tooth divisions through which the blank 8 turns at each cycle with respect to the planing tools is dependent on the selected transmission ratio between the master gear 15 and toothed segment 23 and can also be varied by other arrangements to be described below.

If the gear blank is to be worked in several sections 11 (see FIG. 7), it must be movable with respect to planing tools 1 and 2 in its axial direction. This adjustability can be made possible in a simple manner by making the bearing block which carries the double spindles 16, 17, movable with respect to the planing tools in the direction of arrow 35 (FIG. 9).

In order to be able to work on blanks of different diameters, the planing tools 1 and 2 are mounted adjustably in the radial direction of the blank. They can, for example, be mounted on an arm 42 which is journaled on axis 42' on the machine frame 84 from which it is supported by a bearing block 82 and is swingable in the direction of arrow 41 and fastenable in any desired position by means of an extension 93 of arm 42 having pivoted to it a threaded sleeve engaging a threaded spindle 95 which can be turned by crank 94. The planing tools can also be mounted adjustably in slits in the machine frame.

Figures 15, 16:
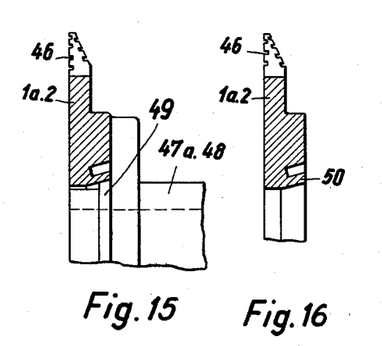

In order to carry out the operation on the gear blank quickly and effectively it is advantageous to arrange, near the planing tools 1 and 2, one or more pre-cutting tools 43, 44, with cutting surfaces for pre-hobbing or pre-grinding tooth gaps 45. To assure cutting operation it is advantageous to construct the planing pre-cutting tools with transverse notches and to provide the cutting surfaces, as shown in FIGS. 15 and 16, with chip-breaking grooves 46. Because of the simple shape of the cutting surfaces 3 to 7, it is quite easy to form the cutting edges of hard metal or ceramic material, particularly ceramic oxides.

The planing tools 1 and 2, as well as the pre-cutting tools 43, 44, can be constructed as hobs or as grinding tools, so that an effective grinding of the tooth flanks 31, 32 of the blank 8 is possible. The exact form of the tooth flanks 31 and 32 is determined only by the two cutting surfaces 3, 4 of the planing tools and, in order to preserve these cutting surfaces for the finishing operation, the preparatory work on the tool flanks is done only by cutting surfaces 5 and 6. In order to accomplish this and to be able to pre-cut and finish blanks with both of various sizes, the planing tools 1 and 2 with the pre-cutting tools 43 and 44 (FIG. 8), are mounted on two spindles 47, 48 adjustable axially with respect to each other. The spindle 48 preferably is centrally positioned in spindle 47, and the pre-cutting tools 43, 44 are joined with the planing tools 2 and 1 respectively.

Figure 8:
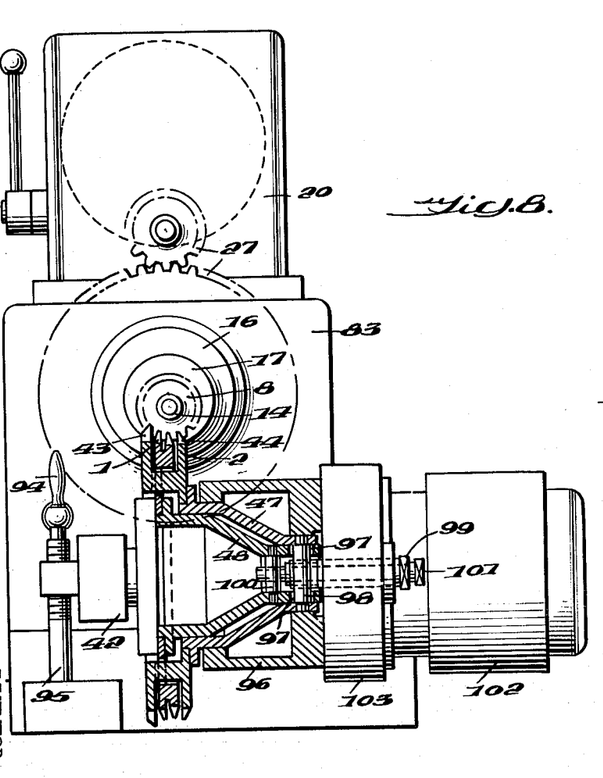
FIG. 8 shows in side view, with parts in section, the blank and cutting members and the mounting means therefor.

As shown in FIG. 8, the spindles 47 and 48 are axially shiftable in a housing 96 fastened in the turntable arm 42. For shifting relative to one another, the outer spindle 47 is provided with a cross-piece 98 passing through longitudinal slots 97 in the spindle 48. A threaded bolt 99 extending outside the casing 96 engages threadedly in an opening in the cross-piece 98. The inner spindle 48 is likewise provided with a cross-piece 100 in which is threadedly engaged a positioning screw 101 which likewise extends from the outside into the housing 96 through the hollow bolt 99. The driving of the tools 1 and 2 and the precutting tools 44 and 45 is produced by an electric motor 102 through a variable intermediate drive 103, both of which are carried by the arm 42.

If the two spindles 47 and 48 are pushed away from each other by manipulating one or both of the bolts 99, 101 and the pre-cutting tools 43 and 44 are then pushed towards each other, as is indicated by arrows in FIG. 4, the cutting surfaces 3 and 4 of the cutting tools 1 and 2 are out of engagement with the tooth flanks and the pre-cutting of the tooth gaps 45 is accomplished by the pre-cutters 43, 44 with cutting surfaces 7, whereas the outer cutting surfaces 5 and 6 of the planing tools after-cut the tooth flanks. For finishing tooth flanks 31, 32, the planing tools 1 and 2, as shown by arrows in FIG. 5, are pushed towards each other so that main cutting surfaces 3 and 4 come into operation.

In order to assure an exact circular travel of the planing tools, these are, as shown in FIGS. 15 and 16, each mounted by an elastic conical lip 50 on a conical seat 49, formed on the spindles 47, 48. The elasticity of the conical lip 50 is only so great as is necessary to maintain the manufacturing tolerances.

Figure 14:
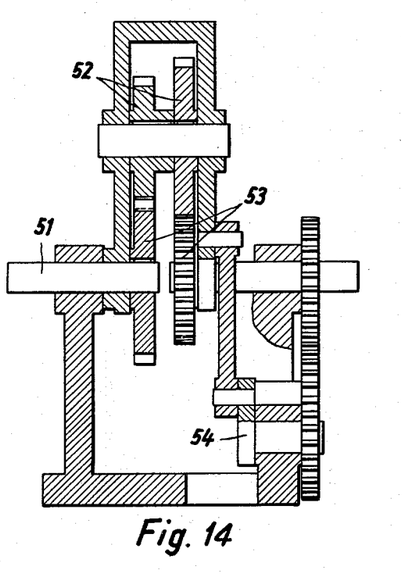

As has been said, the working time required for the blank 8 may be reduced through provision of the pre-cutting tools 43, 44. A further shortening of the operating time can be gained by making the idling time of the gear blank 8, that is, its time of travel when it is away from the planing tools 1, 2, and the pre-cutting tools 43, 44 as short as possible. This can be achieved by imparting to the drive shaft 51 of the transmission 20 a non-uniform turning movement, in which slow turning of the blank during the operating interval is followed by rapid turning during the idling interval. To accomplish this, FIGS. 14 and 15 show two sun gears 53 and two planet gears 52, with different ratios arranged between a shaft driven by a motor 19 and a driven shaft 51 extending into the transmission 20 turnable in the frame 55, the planet gears 52 being mounted in a frame 52' journaled to turn about the axis of shaft 51. This frame is rocked back and forth by a crank and pitman 54 driven by the input shaft, so that the sun gears 53 undergo a back and forth movement in the direction indicated by the arrow: As this swings in the direction of rotation of the shaft 51, the shaft is speeded up while in the opposite direct the driven shaft is slowed down.

Figure 2:
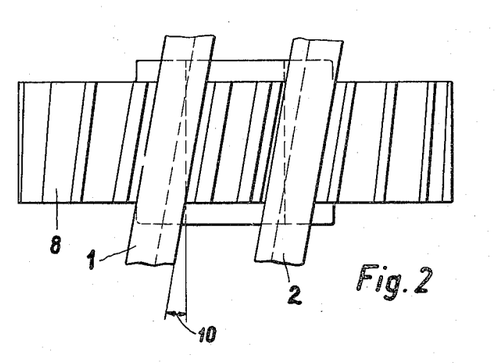
FIG. 2 is a plan view of FIG. 1.

The heretofore described example of the machine according to the invention for the manufacture of pinion gears can be adapted for the manufacture of herring-bone gears from gear blanks; for this purpose, as indicated in FIG. 2, the blanks must be journaled at the desired angle 10 to the planing tools 1 and 2. If a herring-bone gear blank is to be cut in several sectional cuts (FIG. 7), in addition to the axial shifting of the gear blank in the direction of arrow 35, the master gear 15, the two-rack parts 27 and 28 and the segment 23 must be angled accordingly. Like the planing tools 1 and 2, the two rack halves 27 and 28 and the tooth segment 23 should not partake of the axial movement of master gear and blank 8 but should be stationary.

In order to cut blanks with different numbers of teeth, different diameters and different angles of slant, while maintaining the necessary transmission ratio, according to the arrangement of FIG. 9, the master gear 15, the rack parts 27, 28 and the tooth segment 23 are interchangeable.

Figure 10:
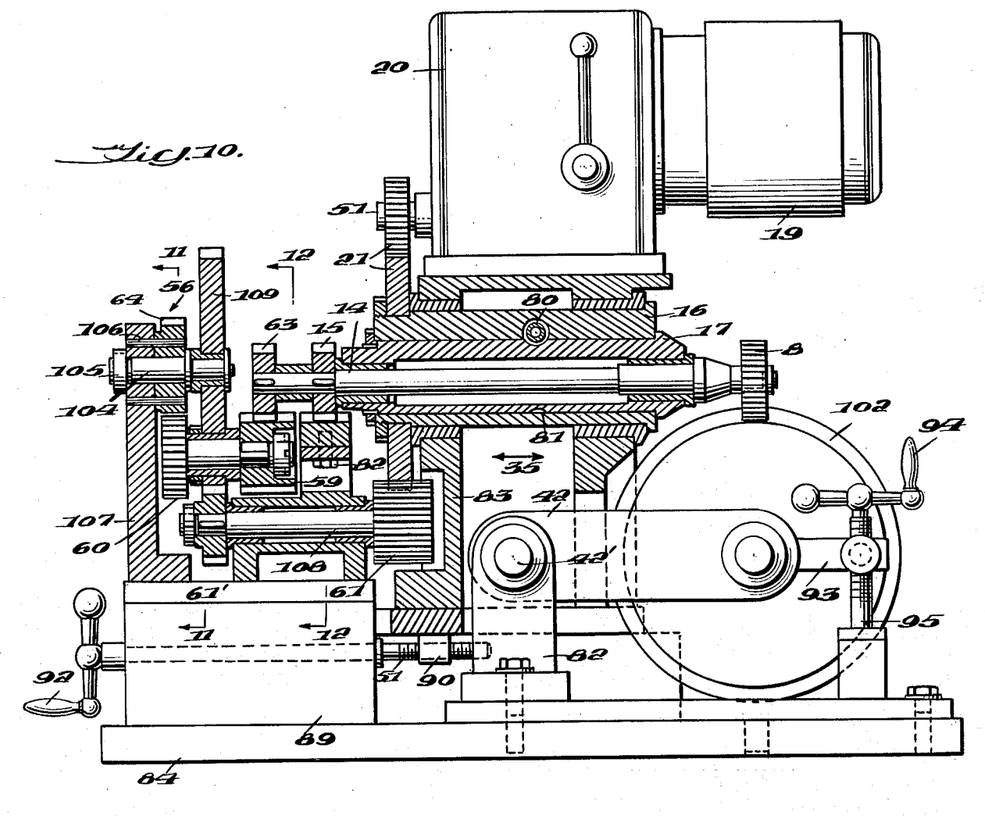
FIG. 10 shows, principally in section, a further modification of the mechanism shown in FIG. 9.
Figure 13:
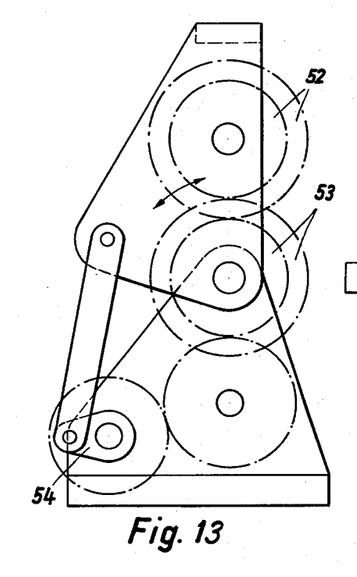
FIGS. 13 and 14 show in side elevation and in cross-section a variable drive arrangement.

A further modification of machine is shown in FIG. 10. The principle different from the arrangement of FIG. 9 is that instead of the curved toothed segment 23, which is quite costly to manufacture, especially if it must be of a herring-bone type, a driving arrangement 56 is used. This arrangement consists of two sun gears 63 and 64 and the planet gears 59, 60. The sun gear 63 is fastened on the shaft 14 which carries master gear 15, whereas the other sun gear 64 is journaled on a separate shaft 104 and is fastened with this shaft through threaded nut 105 and pins 106 on a bracket 107 mounted on the frame part 89 and separate from the bearing block 83. The movement of the two planet gears 59, 60, is obtained from the hollow spindle 16, which mounts the shaft 14 of the master gear 15 and the shaft 14 of the gear blank 8, by a pair of gears 61, 61' which are mounted on the shaft 108, the gear 61' engaging a gear 109 turnably mounted on the shaft 104 and serving as the planet gear carrier. The planet gears 59, 60 and the sun gears 63, 64 may also be bevel gears. The sun gear 64, as shown in FIG. 11, because it replaces the usual internally toothed segment 23, is constructed as a toothed gear segment, so that during engagement of the master gear 15 in the tooth segments 27, 28 the planet gear 60 is in engagement with the sun gear 64. But the sun gear 64 can also be constructed as a complete gear which must then, as is shown in FIG. 17, be connected with one of the two planet gears 59, 60 by an elastic coupling 62 or the like, through which the movement of the master gear 15, differing from the normal movement is assured between the two rack halves 27, 28.

Figure 17:
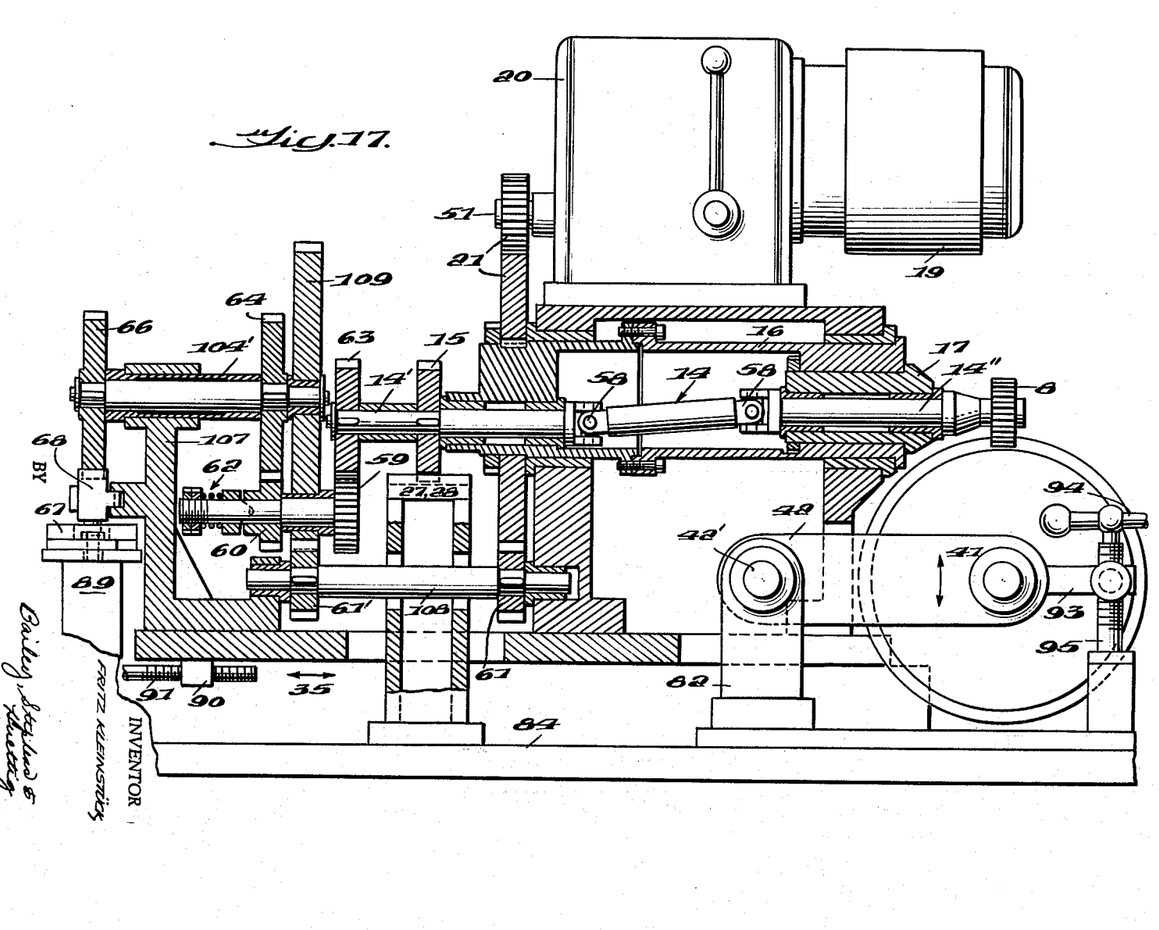
FIG. 17 shows in cross-section similar to FIG. 10 a modified form of the device.

The construction of FIG. 10 can be modified as shown in FIG. 17, in that the master gear 15 and the shaft 14 carrying the blank can be constructed as flexible shafts with two universal joints 58, so that the end section 14' of the shaft which carries the master gear 15 can be mounted with constant eccentricity directly in the hollow spindle 16 and the section 14" carrying the blank 8 can be journaled as previously described in the double spindle 16, 17 and its eccentric journaling can then be adjustable through changing the position of spindle 17 in the spindle 16.

With this modification it is possible to form, with the same master gear 15, different gear teeth which have, with the same number of teeth, varying tooth divisions. This is accomplished through the eccentric journaling of the shaft section 14".

Figure 7:
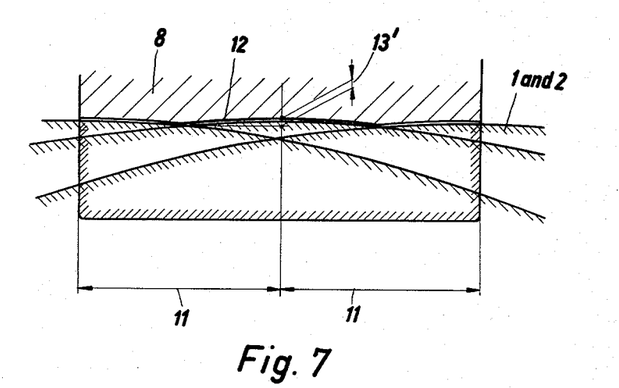

If the gear blank 8 is to be cut on an angle in several sections 11, as in FIG. 7, in addition to the general axial movement of the gear blank 8 in the direction of the arrow 35 by means of threaded spindle 91, the sun gear 64 must undergo an additional turning movement. This additional turning movement is accomplished by a rack 68 engaging gear 66 and a stationary guide member 67, adjustable to the corresponding angle of slope 10.

Figure 18:
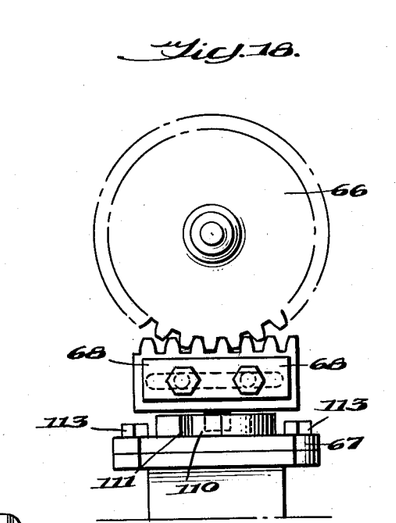
FIG. 18 shows a part of the mechanism of FIG. 17 seen from the left hand side.
Figure 19:
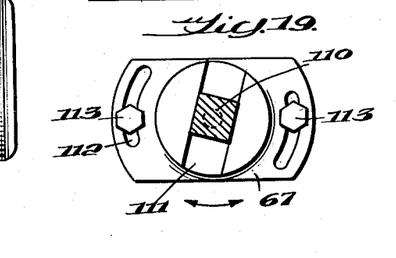
FIG. 19 is an end view thereof.

For this purpose, the sun gear 64 is not mounted on a stationary shaft 104 as shown in FIG. 10 but is fixed on a shaft 104' rotatably journaled in the bracket 107, which also carries fixed to it the gear 66. A rack 68 engages the gear 66, this rack engaging with a projection 110 (FIGS. 18 and 19) in a groove 111 of a guide member 67 carried by the frame member below the gear 66. The guide member is provided with two arcuate slots 112, through which the fastening bolts 113 of the guide extend. By loosening and tightening these bolts the guide member can be set at the proper angle 10 to the blank 8 to be cut, and thus gears with different tooth angles can be formed.

It is desirable however that the master gear 15 and the rack sections 27, 28 be constructed with the corresponding angle.

Because the sun gear 65 must in this arrangement be constructed as a complete gear, and not as a gear segment as shown in FIG. 11, so that the additional turning movement is assured for the carrying out of normal planetary motion, that is when the sun gear 63 is in engagement with the planet gear 59, or when the master gear 15 is in engagement with the tooth segment, 27, 28, the planet gears 59, 60 are provided with an elastic coupling 62.

While I have described herein some embodiments of my invention I wish it to be understood that I do not intend to limit myself except by the scope of the claims hereby granted to me.

I claim:

1. Machine for the production of externally toothed gears comprising shaft means, means to mount a master gear and a gear blank on said shaft means, means mounting at least that part of the shaft means which carries the gear blank for movement thereof with its axis travelling in a circle, means to move said shaft means cyclically in said circle, a pair of material-removing members, having straight material removing faces, means mounting said members for rotation adjacent a first part of such circle opposite a gear blank carried by the shaft means in a position to engage such blank when the axis of the shaft is in the part of the curve adjacent such members, means positioned opposite the master gear including an internally toothed curved part having a number of teeth per degree different from the number of teeth of the master gear engageable with the master gear in the second part of the circle remote from the members, and a straight rack engageable with the master gear during the time when the axis is in the part of the curve adjacent the members for guiding the blank during the removal of material therefrom, said rack having a plurality of teeth, the surface on one side of each rack tooth being parallel to a line from the center of the circle perpendicular to the longitudinal axis of the rack.

2. In a device as claimed in claim 1, the parallel surfaces of the rack teeth on either side of such line facing inwardly towards the line.

3. In a device as clamed in claim 1, the teeth of said rack at least in part closer to the center of said circle than the teeth of said internally toothed curved part.

4. In an apparatus as claimed in claim 1, said moving means operating slowly in the first part of said curve and rapidly in the second section of the curve.

5. In an apparatus as claimed in claim 1, said moving means including a motor and means connecting the motor to the shaft mounting means, said connecting means including a first shaft driven by said motor, a gear on said shaft, a second shaft connected to said mounting means, a gear on said second shaft, a frame pivoted on the axis of the first shaft, a third shaft carried by said frame, gears fixed on said third shaft engaging the gears on the first and second shafts, and means connected to one of the shafts to rock said frame, whereby uniform motion of the first shaft is converted into relatively fast and relatively slow motion of said second shaft.

6. In a device as claimed in claim 1, in which said shaft means is a single shaft on which said master gear and said gear blank are secured, said shaft mounting means including a pair of spindles, one spindle having an eccentric bore therein in which said shaft is mounted, the second spindle having an eccentric bore therein in which the first spindle is adjustable turnable.

7. In an apparatus as is claimed in claim 1, in which said shaft means includes a first shaft on which the master gear is mounted, said shaft being turnable about a fixed axis, and a second shaft on which the gear blank is mounted and a flexible connection between said shafts.

8. In an apparatus as is claimed in claim 1, means mounting at least the shaft means carrying the gear blank for axial adjustment.

9. In a device as claimed in claim 1, in which said shaft means is a single shaft on which said master gear and said gear blank are secured, said shaft mounting means including a spindle having an eccentric bore therein in which said shaft is mounted.

10. In an apparatus as claimed in claim 9, in which said rack has two facing guiding surfaces engageable with said master gear.

11. An apparatus as claimed in claim 10, in which said rack comprises two relatively movable parts one having each of said guiding surfaces thereon, whereby said surfaces can be adjusted to engage the master gear without play.

12. Machine for the production of externally toothed gears comprising shaft means, means to mount a master gear and a gear blank on said shaft means, means mounting at least that part of the shaft means which carries the gear blank for movement thereof with its travelling in a circle, means to move said shaft means cyclically in said circle, a pair of material-removing members having straight material removing faces, means mounting said members for rotation adjacent a first part of such circle opposite a gear blank carried by the shaft means in a position to engage such blank when the axis of the shaft is in the part of the curve adjacent such members, means operably connected with the master gear to turn the same in the second part of the circle remote from the members through an amount to advance the same through an integral number of teeth so as to advance the gear blank to a new position, and a straight rack engageable with the master gear during the time when the axis is in the part of the curve adjacent the members for guiding the blank during the removal of material therefrom, said rack having a plurality of teeth, the surface on one side of each rack tooth being parallel to a line from the center of the circle perpendicular to the longitudinal axis of the rack.

13. In an apparatus as is claimed in claim 12, said master gear turning means including two pairs of meshing gears, one gear of the first pair being connected to said master gear, means to immobilize one gear of the second pair, and means including ratio varying means connecting the other gears of said pairs.

14. In an apparatus as is claimed in claim 12, means mounting said material removing members for relative axial movement therebetween.

15. In an apparatus as is claimed in claim 12, said material-removing-member mounting means including a pair of hollow spindles one within the other, carrying said members, means mounting said spindles for relative axial movement there-between, each member having an elastic lip centered on the spindle.

16. In an apparatus as is claimed in claim 12, said material-removing-members comprising discs having material-removing surfaces near their periphery on each side thereof, and means mounting said discs for relative axial movement therebetween, whereby said members can remove material from both sides of a tooth gap.

17. In an apparatus as is claimed in claim 12, auxiliary material-removing members for rough cutting mounted to turn with said material removing members.

References Cited by the Examiner
UNITED STATES PATENTS

| | | | |
|---|---|---|---|
| 1,633,051 | 6/27 | Trbojevich | 90—3 X |
| 2,356,869 | 8/44 | Miller | 51—287 |
| 2,360,235 | 10/44 | Jellis | 90—3 X |

FOREIGN PATENTS

| | | |
|---|---|---|
| 129,461 | 10/59 | U.S.S.R. |

ANDREW R. JUHASZ, *Primary Examiner.*

LEON PEAR, *Examiner.*